(12) United States Patent
Gruensfelder et al.

(10) Patent No.: US 6,213,433 B1
(45) Date of Patent: Apr. 10, 2001

(54) LEADING EDGE FOR AN AIRCRAFT

(75) Inventors: Cynthia Ann Gruensfelder, St. Louis, MO (US); Lawrence O. Brase, Jr., Edwardsville, IL (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/525,535

(22) Filed: Mar. 14, 2000

Related U.S. Application Data

(63) Continuation of application No. 09/082,827, filed on May 21, 1998, now abandoned.

(51) Int. Cl.[7] ....................................................... B64C 3/44
(52) U.S. Cl. ........................ 244/219; 244/134 R; 244/214
(58) Field of Search ..................................... 244/200, 201, 244/213, 214, 219, 130, 75 R, 134 R, 134 D, 134 B

(56) References Cited

U.S. PATENT DOCUMENTS

| | | |
|---|---|---|
| 2,368,702 | 2/1945 | Bourne . |
| 2,539,576 | 1/1951 | Gregg . |
| 2,731,221 | 1/1956 | Holton . |
| 2,932,470 | 4/1960 | Edkins . |
| 2,970,794 | 2/1961 | Johnson . |
| 3,109,613 | 11/1963 | Bryant et al. . |
| 3,698,668 | 10/1972 | Cole . |
| 4,012,013 | 3/1977 | Ball et al. . |
| 4,113,210 | 9/1978 | Pierce . |
| 4,341,176 | 7/1982 | Orrison . |
| 4,429,844 | 2/1984 | Brown et al. . |
| 4,892,626 | 1/1990 | Covey . |
| 5,222,699 | 6/1993 | Albach et al. . |
| 5,531,407 | 7/1996 | Austin et al. . |
| 5,662,294 | 9/1997 | Maclean et al. . |
| 5,794,893 | 8/1998 | Diller et al. . |
| 5,810,291 | 9/1998 | Geiger et al. . |
| 5,896,191 | 4/1999 | Beier et al. . |
| 5,913,494 | 6/1999 | Burbridge et al. . |
| 5,927,651 | 7/1999 | Geders et al. . |
| 5,931,422 | 8/1999 | Geiger et al. . |
| 5,941,480 | 8/1999 | Wille . |
| 5,947,417 | 9/1999 | Cameron . |
| 5,947,422 | 9/1999 | Willie . |
| 5,958,803 | 9/1999 | Geiger . |
| 5,975,463 | 11/1999 | Gruensfelder et al. . |
| 5,975,466 | 11/1999 | Kahara et al. . |

*Primary Examiner*—Galen L. Barefoot
(74) *Attorney, Agent, or Firm*—Harness Dickey & Pierce PLC

(57) ABSTRACT

A leading edge (50) for an aircraft has a hard durometer elastomer tip (52). An elastomer panel (54) has a first end attached to the hard durometer elastomer tip (52) and has a plurality of reinforcing members capable of freely sliding inside the elastomer panel (54). A rigid block (58) is attached to a second end of the elastomer panel (54) and is attached to a structure (62) of the aircraft.

18 Claims, 4 Drawing Sheets

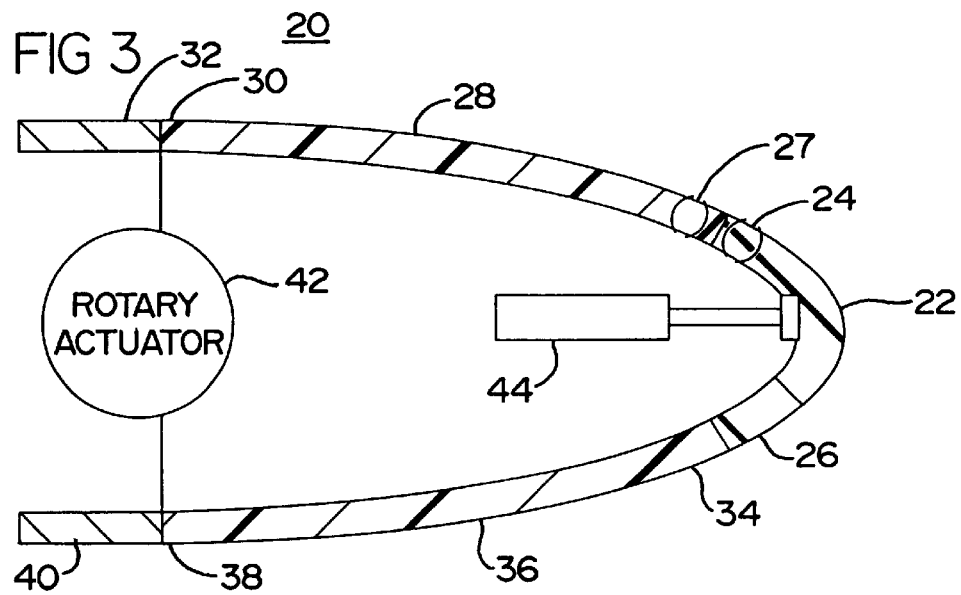
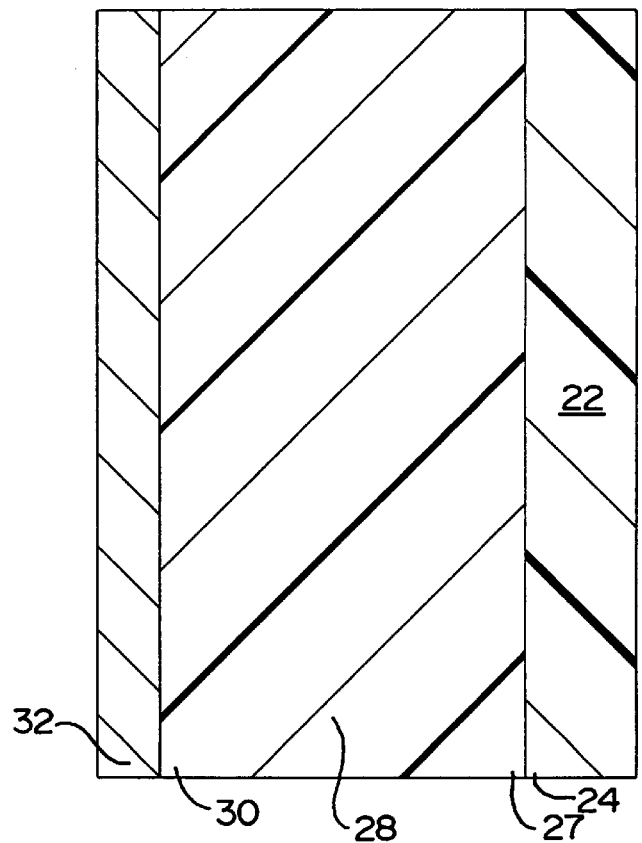

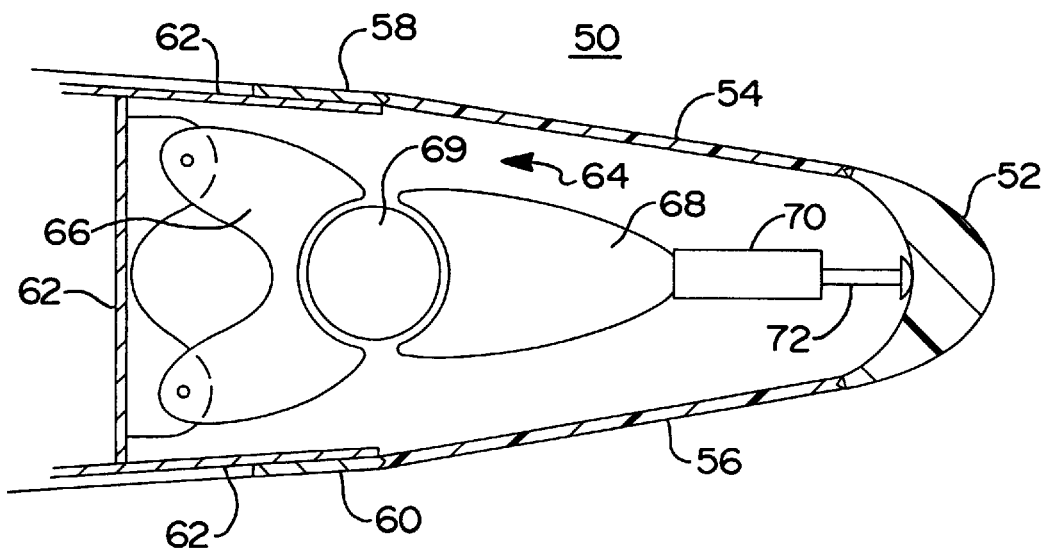
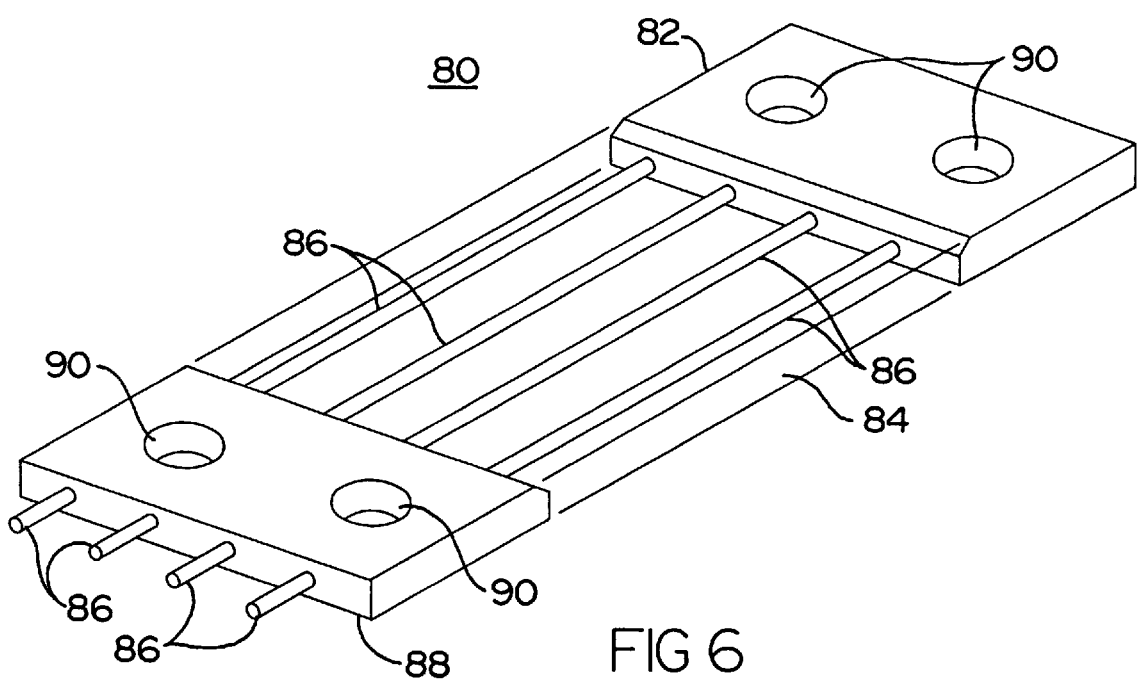

LEADING EDGE FOR AN AIRCRAFT

This is a continuation of U.S. patent application No. 09/082,827, filed May 21, 1998, now abandoned.

FIELD OF THE INVENTION

The present invention relates generally to the field of aircraft and more particularly to a leading edge for an aircraft.

BACKGROUND OF THE INVENTION

The leading edges of an aircraft, such as the leading edge of a wing. require shape tailoring for optimum performance throughout the operating range of the aircraft. Present leading edge designs expose gaps that limit the performance of the wing. These gaps result in pressure losses that limit the lift resulting from the leading edge. Other leading edge designs, such as fixed edges, significantly limit the shape tailoring of the leading edge.

Thus there exists a need for a leading edge design that allows a wide range of shape tailoring without exposing gaps.

SUMMARY OF THE INVENTION

A leading edge for an aircraft that overcomes these and other problems has a hard durometer elastomer tip. An elastomer panel has a first end attached to the hard durometer elastomer tip and has a plurality of reinforcing members capable of freely sliding inside the elastomer panel. A rigid block is attached to a second end of the elastomer panel and is attached to a structure of the aircraft.

BRIEF DESCRIPTION OF THE DRAWINGS

FIG. 3 is a cross sectional view of an embodiment of a leading edge according to the invention;

FIG. 4 is a top view of the leading edge of FIG. 3;

FIG. 5 is a cross sectional view of an embodiment of a leading edge according to the invention;

FIG. 6 is a perspective view of a rod reinforced elastomer panel; and

DETAILED DESCRIPTION OF THE DRAWINGS

Figure 1:
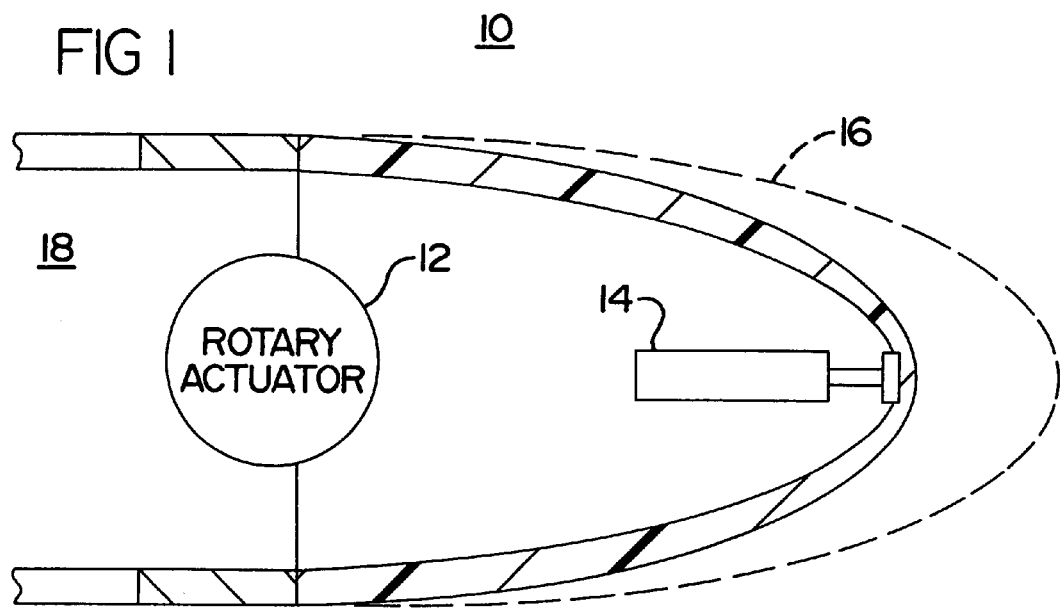
FIG. 1 is a schematic diagram of a leading edge according to the invention.
Figure 2:
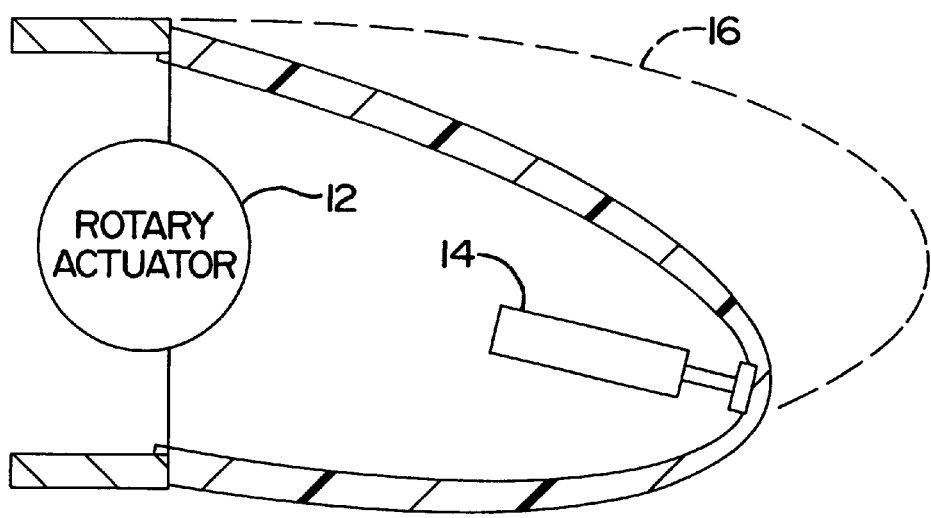
FIG. 2 is a schematic diagram of the leading edge of FIG. 1 in a deflected and blunted state.

FIG. 1 is a schematic diagram of a leading edge 10 according to the invention. The leading edge 10 has a rotary actuator 12 for pivoting the leading edge 10. A linear actuator 14 is used for blunting the leading edge. The dashed lines 16 show the leading edge in an extended state. The leading edge is typically connected to the wing 18 of an aircraft. FIG. 2 is a schematic diagram of the leading edge 10 of FIG. 1 in a deflected and blunted state. A reinforced elastomer panel is used to realize the gapless smooth curvilinear shape of the leading edge through out its operating range, as will be discussed in more detail below.

FIG. 3 is a cross sectional view of an embodiment of a leading edge 20 according to the invention. A hard durometer elastomer tip 22 has a first edge 24 and a second edge 26. The first edge 24 of the hard durometer elastomer tip 22 is connected to a first edge 27 of a first reinforced elastomer panel (gapless smooth curvilinear shape) 28. In one embodiment a plurality of reinforcing members are attached to the hard durometer elastomer tip 22. These reinforcing members slide within the elastomer panel 28. The reinforced elastomer panel will be discussed in more detail in conjunction with FIG. 6. A second edge 30 of the first reinforced elastomer panel 28 is connected to a first rigid block 32. In one embodiment the first rigid block 32 is made of a metal. The first rigid block 32 is attached to a structure of the aircraft. The second edge 26 of the hard durometer elastomer tip 22 is connected to a first edge 34 of a second elastomer sheet 36. A second edge 38 of the second elastomer sheet 36 is connected to a second rigid block 40. The second elastomer sheet includes a plurality of second reinforcing members. The leading edge includes a rotary actuator 42 and a blunting actuator 44. The rotary actuator 42 deflects the leading edge up or down and the blunting actuator 44 pushes the tip 22 in and out. FIG. 4 is a top view of the leading edge of FIG. 3. This view shows the tip 22 connected to the reinforced elastomer panel 28 and the rigid block 32. At an outer edge of the wing in one embodiment a transition section connects to the wing. The transition section in one embodiment is an unreinforced elastomer panel. Another transition section is included at an inner edge of the leading edge in one embodiment. As can be seen from this embodiment the invention provides for a leading edge that does not have any gaps and provides a wide range of shape tailoring for the leading edge.

FIG. 5 is a cross sectional view of an embodiment of a leading edge 50 according to the invention. The leading edge 50 has a hard durometer elastomer tip 52. A reinforced elastomer panel (first reinforced elastomer panel, first elastomer sheet) 54 connects to the tip 52. A second reinforced elastomer panel 56 connects to the other side of the tip 52. In one embodiment, both elastomer panels 54, 56 are permanently attached to the tip 52. Both elastomer panels 54, 56 have a rigid block 58, 60 that attaches to a structure 62 of the aircraft. A skeletal structure 64 is attached to the structure of the aircraft. The skeletal structure includes a base 66 connected to a finger 68 by a rotary actuator 69. A blunting actuator 70 is attached to the skeletal structure 64. The blunting actuator 70 has a piston 72 that moves the tip from a blunt state (retracted position) to an extended state (extended position).

FIG. 6 is a perspective view of a rod reinforced elastomer panel 80. The elastomer panel 80 has a rod block 82 attached along one edge to an elastomer skin 84. The elastomer skin 84 is capable of stretching to 100% of its unstressed length. In addition, the elastomer skin 84 is capable of twisting. A plurality of rods 86 are attached to the rod block 82 and are allowed to slide freely inside the elastomer skin 84. In the embodiment used with the leading edge the rods are attached to the hard durometer tip. The rods 86 are made from quartz, epoxy or composites and flex without breaking. The stiffness of these reinforcements is designed to yield a specific expanded shape. The rods 86 slide freely inside a second rod block 88. The rods 86 provide the elastomer skin 84 with a smooth curvilinear shape when the elastomer panel 80 is elongated, deflected or twisted. This curvilinear shape provides a good aerodynamic shape without any discontinuities that cause turbulence and drag. A plurality of attachment provisions 90 are used to attach the elastomer panel 80 to the aircraft.

Figure 7:
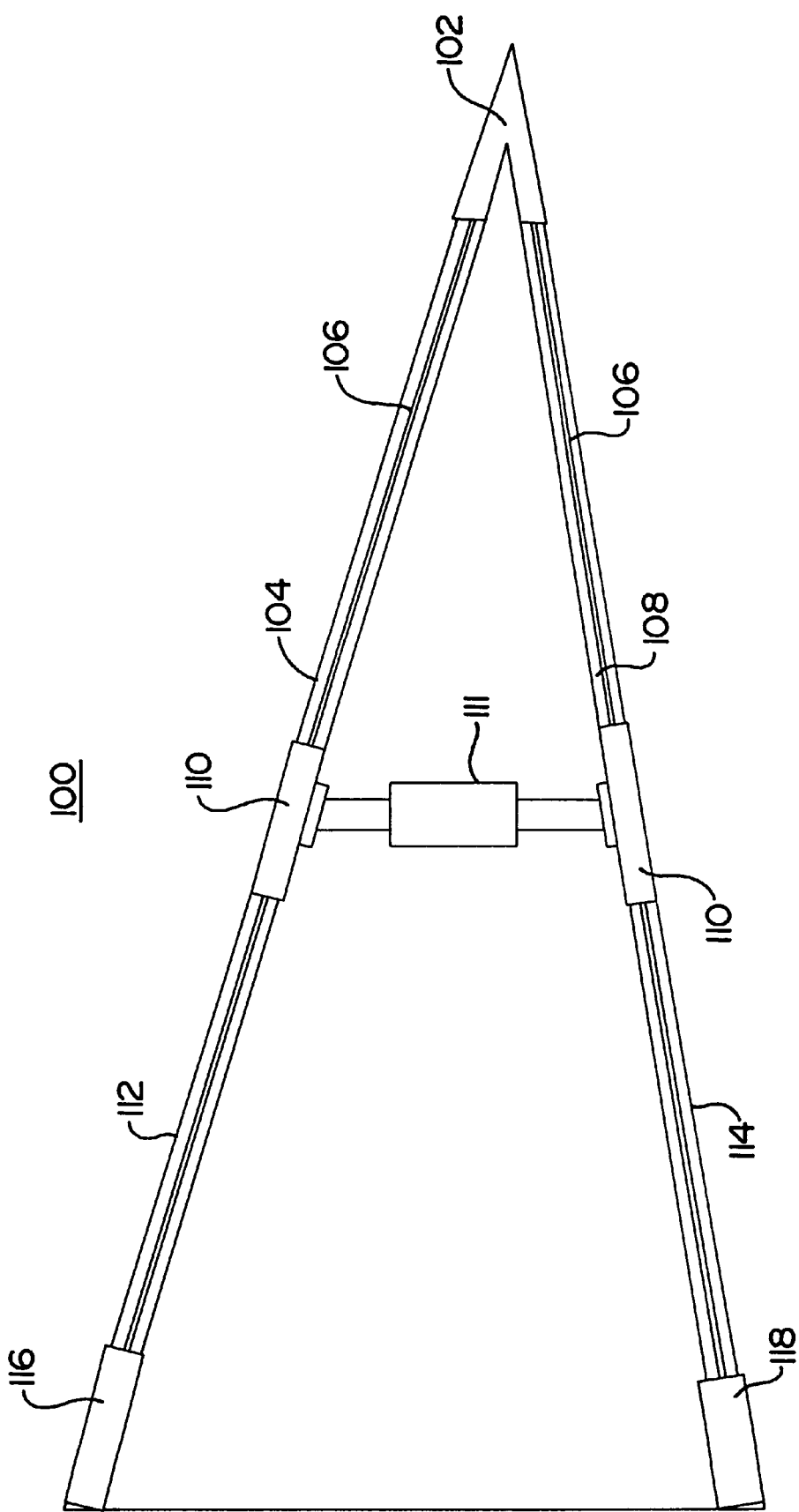
FIG. 7 is a cross sectional view of an embodiment of an anti-icing edge for an aircraft.

FIG. 7 is a cross sectional view of an embodiment of an anti-icing edge 100 for an aircraft. A hard durometer elastomer tip 102 is connected to a first reinforced elastomer panel 104. A reinforcing member 106 is shown inside the elastomer. A second reinforced elastomer panel 108 is connected to the other side of the hard durometer tip 102. A pair of center rigid blocks 110 are connected to the elastomer panels 104, 108. An actuator (anti-icing) 111 is shown connected between the pair of center rigid blocks 110. A third reinforced elastomer 112 and a fourth reinforced elastomer panel 114 are connected to the pair of center rigid blocks 110. A pair of inner rigid blocks 116, 118 attach to a structure of the aircraft. By moving the actuator 111 the reinforced elastomer panels 104, 108, 112, 114 are forced to deflect. Any ice attached to the structure 100 is cracked and popped off of the edge.

Thus there has been described a leading edge that allows a wide range of shape tailoring without exposing gaps. In addition, a deicing edge has been described. In one embodiment the leading edge and deicing edges are combined into a single edge. While the invention has been described in conjunction with specific embodiments thereof, it is evident that many alterations, modifications, and variations will be apparent to those skilled in the art in light of the foregoing description. For instance, the reinforcing rods can be replaced with reinforcing slats. Accordingly, it is intended to embrace all such alterations, modifications, and variations in the appended claims.

What is claimed is:

1. An edge for a portion of an aircraft comprising:
   a hard durometer elastomer tip having first and second ends;
   a first elastomer panel having a first end attached to the first end of the hard durometer elastomer tip, a second end and a plurality of reinforcing members capable of freely sliding inside the first elastomer panel;
   a second elastomer panel having a first end attached to the second end of the hard durometer elastomer tip and a second end;
   a first rigid block attached to the second end of the first elastomer panel and the portion of the aircraft;
   a second rigid block attached to the second end of the second elastomer panel and the portion of the aircraft; and
   a system within said portion of the aircraft for controllably altering the shape of the portion; and
   wherein the portion has no gaps or crevices regardless of the shape which it is caused to assume.

2. The leading edge of claim 1, further including a blunting actuator connected to the hard durometer elastomer tip.

3. The leading edge of claim 1, further including a skeletal structure pivotally connected to the structure of the aircraft and supporting the blunting actuator.

4. The leading edge of claim 3, further including a rotary actuator attached to the skeletal structure.

5. The leading edge of claim 1, wherein the plurality of reinforcing members are permanently attached to the hard durometer elastomer tip.

6. The leading edge of claim 5, wherein the plurality of reinforcing members slide freely through the rigid block.

7. The leading edge of claim 1, further including a second elastomer panel having a first end attached to a second side of the hard durometer elastomer tip and a second end attached to a second rigid block, the second rigid block attached to the structure of the aircraft.

8. The leading edge of claim 7, further including an actuator having a first end attached to the first elastomer panel and a second end attached to the second elastomer panel.

9. An anti-icing edge for an aircraft comprising;
   a hard durometer elastomer tip having a first edge and a second edge;
   a first reinforced elastomer panel having a first edge attached to the first edge of the hard durometer elastomer tip;
   a first rigid block attached to a structure of the aircraft, the first rigid block connected to a second edge of the first reinforced elastomer panel;
   a second reinforced elastomer panel having a first edge attached to the second edge of the hard durometer elastomer tip;
   a second rigid block attached to the structure of the aircraft, the second rigid block connected to a second edge of the second reinforced elastomer panel; and
   an actuator connected between the first reinforced elastomer panel and the second reinforced elastomer panel, the actuator operable for deflecting the first and second reinforced elastomer panels; and
   wherein deflection of the first and second reinforced elastomer panels is adapted to crack an ice formation on at least one of the first and second reinforced elastomer panels to facilitate the removal of the ice formation therefrom.

10. The anti-icing edge of claim 9, wherein the first reinforced elastomer panel includes a plurality of reinforcing members capable of sliding freely inside the first reinforced elastomer panel.

11. The anti-icing edge of claim 9, wherein a plurality of reinforcing members are attached to the hard durometer elastomer tip.

12. The anti-icing edge of claim 9, wherein the first reinforced elastomer panel includes a center rigid block attached to the actuator.

13. The anti-icing edge of claim 9, wherein the actuator has a retracted position and an extended position.

14. The anti-icing edge of claim 13, wherein the first reinforced elastomer panel and the second reinforced elastomer panel have a gapless smooth curvilinear shape when the actuator is in the extended position.

15. The anti-icing edge of claim 9, further including a blunting actuator connected to the hard durometer elastomer tip.

16. The anti-icing edge of claim 15, further including a skeletal structure pivotally attached to the structure of the aircraft, the skeletal structure holding the blunting actuator.

17. A leading edge for an aircraft having a structure, the leading edge comprising:
   a hard durometer elastomer tip having a first edge and a second edge;
   a first elastomer sheet having a first edge and a second edge, the first edge of the first elastomer sheet connected to the first edge of the hard durometer elastomer tip, the second edge of the first elastomer sheet connected to the structure, the first elastomer sheet connected to the hard durometer elastomer tip and the structure in a continuous manner without gaps, crevices, and discontinuities that cause turbulence and drag;
   a plurality of first reinforcing members sliding freely inside the first elastomer sheet, the plurality of first reinforcing members having a first end attached to the hard durometer elastomer tip;
   a first rigid block attached to the structure of the aircraft, the first rigid block connected to a second edge of the first elastomer sheet and the plurality of first reinforcing members sliding freely inside the first rigid block;

a second elastomer sheet having a first edge and a second edge, the first edge of the second elastomer sheet connected to the second edge of the hard durometer elastomer tip, the second edge of the second elastomer sheet connected to the structure, the second elastomer sheet connected to the hard durometer elastomer tip and the structure in a continuous manner without gaps, crevices and discontinuities that cause turbulence and drag;

a plurality of second reinforcing members sliding freely inside the second elastomer sheet, the plurality or second reinforcing members having a first end attached to the hard durometer elastomer tip;

a second rigid block attached to the structure of the aircraft, the second rigid block connected to a second edge of the second elastomer sheet and the plurality of second reinforcing members sliding freely inside the second rigid block;

a skeletal structure pivotally attached to a structure of the aircraft;

a blunting actuator attached to the skeletal structure and connected to the hard durometer tip; and a rotary actuator connected to the skeletal structure.

18. The leading edge of claim 17, further including an anti-icing actuator connected between the first elastomer sheet and the second elastomer sheet.

\* \* \* \* \*